(12) United States Patent
Rave et al.

(10) Patent No.: US 10,815,554 B2
(45) Date of Patent: Oct. 27, 2020

(54) FERRITIC ALLOY

(71) Applicant: SANDVIK INTELECTUAL PROPERTY AB, Sandviken (SE)

(72) Inventors: Fernando Rave, Vasteras (SE); Peter Szakalos, Stockholm (SE); Bo Jonsson, Vasteras (SE); Jesper Ejenstam, Solna (SE); Susanne Hellstrom Selin, Vasteras (SE)

(73) Assignee: Sandvik Intellectual Property AB, Sandviken (SE)

( * ) Notice: Subject to any disclaimer, the term of this patent is extended or adjusted under 35 U.S.C. 154(b) by 129 days.

(21) Appl. No.: 15/534,566

(22) PCT Filed: Dec. 11, 2015

(86) PCT No.: PCT/EP2015/079457
§ 371 (c)(1),
(2) Date: Jun. 9, 2017

(87) PCT Pub. No.: WO2016/092085
PCT Pub. Date: Jun. 16, 2016

(65) Prior Publication Data
US 2017/0342531 A1    Nov. 30, 2017

(30) Foreign Application Priority Data
Dec. 11, 2014   (EP) .................. 14197362

(51) Int. Cl.
*C22C 38/28*   (2006.01)
*C22C 38/00*   (2006.01)
(Continued)

(52) U.S. Cl.
CPC ............... *C22C 38/28* (2013.01); *C22C 1/02* (2013.01); *C22C 33/0285* (2013.01);
(Continued)

(58) Field of Classification Search
CPC ....... C22C 38/001; C22C 38/02; C22C 38/22; C22C 38/24; C22C 38/26; C22C 38/28; C22C 38/32
(Continued)

(56) References Cited

U.S. PATENT DOCUMENTS 4,414,023 A * 11/1983 Aggen .................... C22C 38/18
420/40
5,228,932 A * 7/1993 Shimizu ............... B01D 53/945
148/325
(Continued)

FOREIGN PATENT DOCUMENTS

CN       103451539 A    12/2013
EP         0091526 A2   10/1983
(Continued)

OTHER PUBLICATIONS

Ejenstam et al: "Microstructural stability of Fe—Cr—Al alloys at 450", Journal of Nuclear Materials, vol. 457, Dec. 3, 2014, pp. 291-297.
(Continued)

*Primary Examiner* — Sheng H Davis
*Assistant Examiner* — Christopher Douglas Moody
(74) *Attorney, Agent, or Firm* — Morgan, Lewis & Bockius LLP

(57) ABSTRACT

A ferritic alloy comprising in weight %:
C: 0.01-0.1;
N: 0.001-0.1;
O: ≤0.2;
B: ≤0.01;
Cr: 9.0-13.0;
Al: 2.5-8.0;
Si: ≤0.5;

(Continued)

Mn: ≤0.4;
Y: ≤2.2;
Sc+Ce+La: ≤0.2;
Mo+W: ≤4.0;
Ti: ≤1.7;
Zr: ≤3.3;
Nb: ≤3.3;
V: ≤1.8;
Hf+Ta+Th: ≤6.5;
the balance being Fe and unavoidable impurities,
wherein, the amounts of Ti+Zr+Nb+V+Hf+Ta+Th and C, N and O are balanced such that:

$$\frac{\text{at }\% \text{ Ti} + \text{at }\% \text{ Zr} + \text{at }\% \text{ Nb} + \text{at }\% \text{ V} + \text{at }\% \text{ Hf} + \text{at }\% \text{ Ta} + \text{at }\% \text{ Th} - x*\text{at }\% \text{ O} - \text{at }\% \text{ N}}{\text{at }\% \text{ C}} \geq 1$$

wherein x is 0.5 unless the content of Y is more than or equal to 0.01 wt % then x is 0.67.

20 Claims, 3 Drawing Sheets

(51) Int. Cl.

| | |
|---|---|
| *C22C 38/02* | (2006.01) |
| *C22C 38/04* | (2006.01) |
| *C22C 38/06* | (2006.01) |
| *C22C 38/22* | (2006.01) |
| *C22C 38/24* | (2006.01) |
| *C22C 38/26* | (2006.01) |
| *C22C 1/02* | (2006.01) |
| *C22C 33/02* | (2006.01) |
| *C22C 38/32* | (2006.01) |
| *G21C 15/28* | (2006.01) |

(52) U.S. Cl.
CPC .......... *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/32* (2013.01); *G21C 15/28* (2013.01); *Y02E 30/40* (2013.01)

(58) Field of Classification Search
USPC ...................................... 420/62, 63
See application file for complete search history.

(56) References Cited

U.S. PATENT DOCUMENTS

| | | | | |
|---|---|---|---|---|
| 5,609,818 | A | * | 3/1997 | Kato ............... C22C 38/18 420/103 |
| 5,785,924 | A | * | 7/1998 | Beguinot ............ C22C 38/42 420/63 |
| 6,231,807 | B1 | * | 5/2001 | Berglund ............ B22F 3/225 148/230 |
| 6,663,984 | B2 | | 12/2003 | Vostrikov et al. |
| 2002/0051727 | A1 | | 5/2002 | Berglund |
| 2007/0041862 | A1 | | 2/2007 | Hattendorf et al. |
| 2008/0069717 | A1 | * | 3/2008 | Inaguma .............. C22C 38/02 420/34 |
| 2015/0218683 | A1 | * | 8/2015 | Nakamura .......... C22C 38/52 420/38 |

FOREIGN PATENT DOCUMENTS

| | | |
|---|---|---|
| JP | S58-177437 A | 10/1983 |
| JP | H01-180945 A | 7/1989 |
| JP | H01-290749 A | 11/1989 |
| JP | H05-202449 A | 8/1993 |
| JP | H05-331552 A | 12/1993 |
| JP | H06-330247 A | 11/1994 |
| KR | 10-1210531 A | 3/2012 |
| RU | 2206631 C2 | 6/2003 |
| RU | 2344192 C2 | 1/2009 |
| RU | 2415963 C2 | 4/2011 |
| WO | 02/20197 A1 | 3/2002 |

OTHER PUBLICATIONS

Ejenstam et al: "Oxidation studies of Fe10CrAl—Re alloys exposed to Pb at 550 Deg C for 10,0" Journal of Nuclear Materials, vol. 443, No. 1, Jun. 17, 2013, pp. 161-170.
Zhang: "A review of steel corrosion by liquid lead and lead-bismuth", Corrosion Science 51 )2009), pp. 1207-1227.
Lim: "Design of alumina forming FeCrAl steels for lead for lead-bismuth cooled fast reactors", Journal of Nuclear Materials 441 (2013), pp. 650-660.
Weisenburger et al: "Oxide scales formed on Fe—Cr.Al-based model alloys exposed to oxygen containing molten lead", Journal of Nuclear Materials 437 (2013) pp. 282-292.
Translation of Decision to Grant with Report on Results of Examination dated Aug. 21, 2019, issued in corresponding Russian Patent Application No. 2017124236/02.
English translation of Russian Office Action dated May 24, 2019 issued in RU Patent Application 2017124236/02.
English translation of Russian Search Report dated Apr. 22, 2019 issued in RU Patent Applicaiton 2017124236/02.
Office Acton dated Sep. 24, 2019, issued in corresponding Japanese Patent Application No. 2017-530265.

* cited by examiner

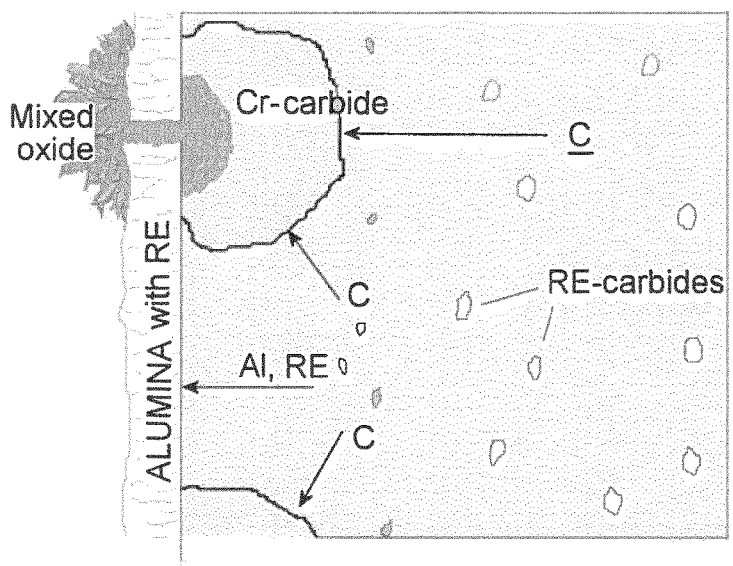
Figure 1
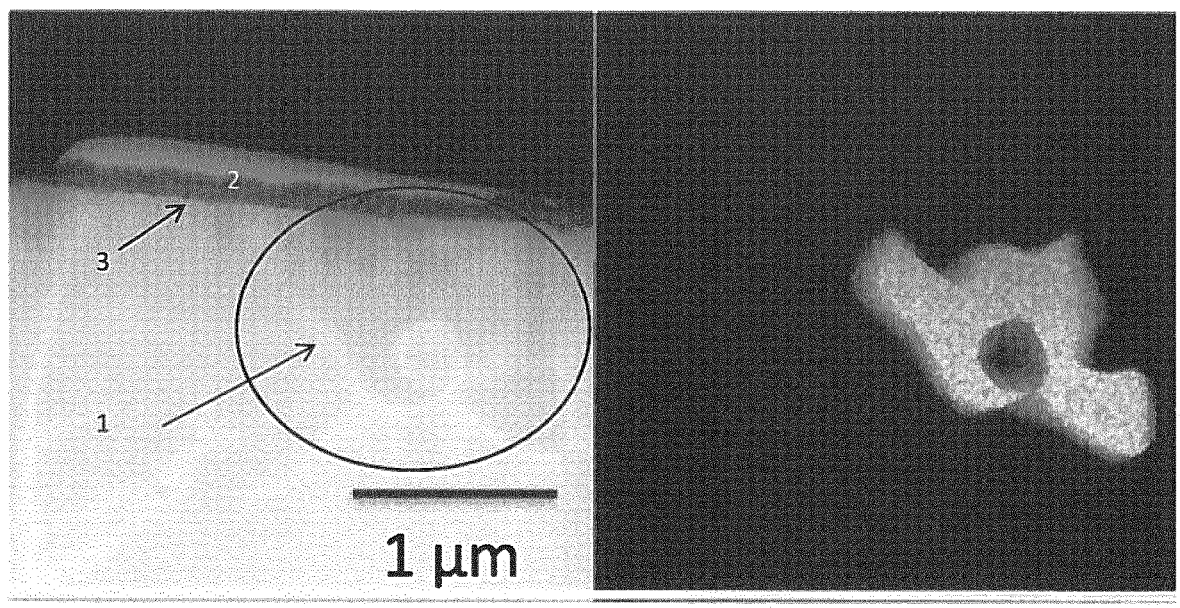
Figure 2a
Figure 2b

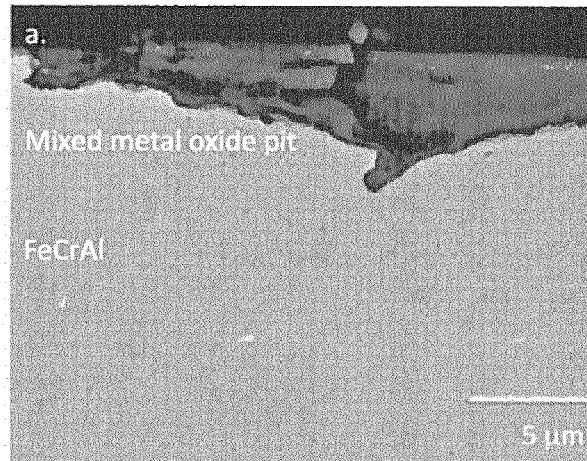
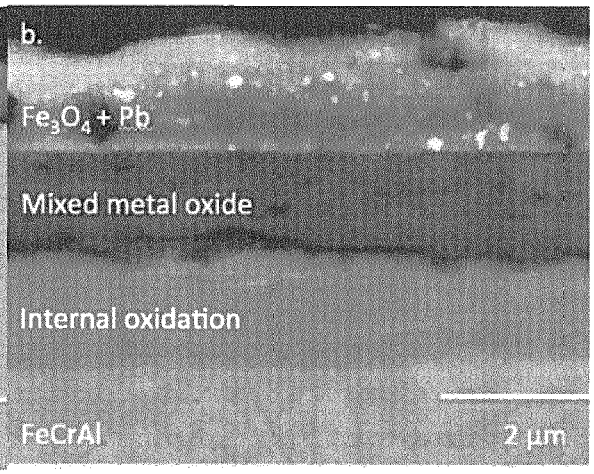
Figure 3a          Figure 3b
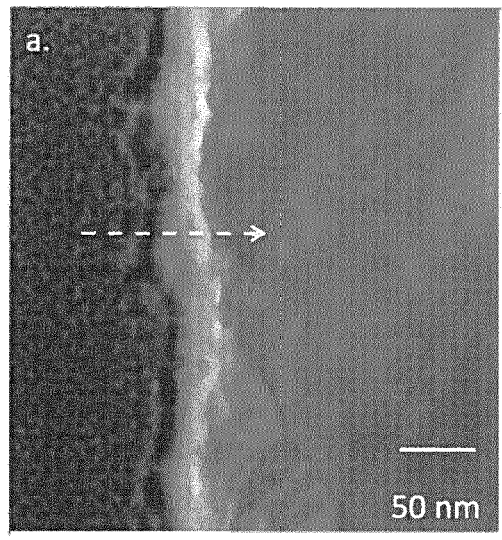
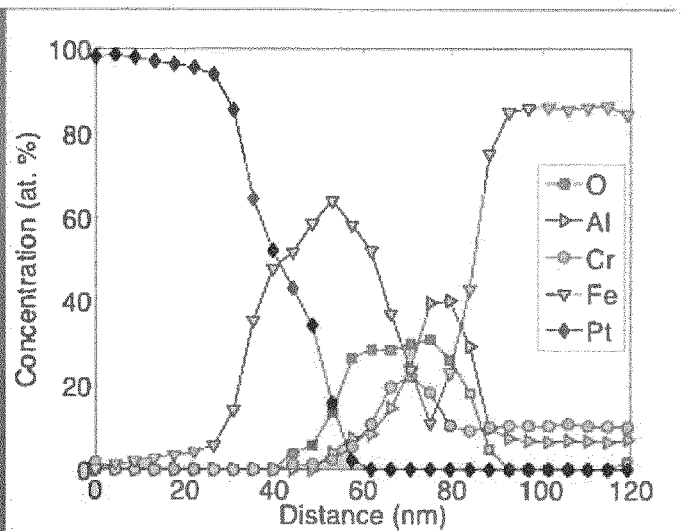
Figure 4a          Figure 4b

FERRITIC ALLOY

RELATED APPLICATION DATA

This application is a § 371 National Stage Application of PCT International Application No. PCT/EP2015/079457 filed Dec. 11, 2015 claiming priority of EP Application No. 14197362.8, filed Dec. 11, 2014.

TECHNICAL FIELD

The present disclosure relates to a ferritic alloy (FeCrAl-alloy) and to the use of the ferritic alloy in the temperature range of 300-800° C.

BACKGROUND ART

In so-called lead-cooled fast reactor (LFR) systems liquid lead is used as a cooling agent. Liquid lead and lead bismuth eutectic (LBE) provides the possibility of passive cooling and thus contributes in making nuclear power safe. However, liquid lead is highly corrosive and put high demands on the corrosion resistance of the construction materials used in the LFR systems.

FeCrAl-alloys have recently been proposed as a candidate material for use in lead-cooled fast reactors due to the good oxidation properties of these alloys, which is a result of the formation of a layer of alumina ($Al_2O_3$) on the alloy surfaces. FeCrAl-alloys are based on aluminum, chromium and iron and due to their oxidation resistance and good creep resistance these alloys are commonly used in heating elements and wires at temperatures at around and in excess of 1000° C. However, lead-cooled fast reactors operate in the temperature interval of 400-600° C. and in this temperature range, commercial FeCrAl-alloys that typically contains around 15-20 wt % Cr suffer from $\alpha$-$\alpha'$ phase separation due to a miscibility gap that is present in the Fe—Cr system. The $\alpha$-$\alpha'$ phase separation results in embrittlement of the FeCrAl-alloy and this makes the commercial FeCrAl-alloys unsuitable as construction materials in the temperature range used in (LFR) systems.

FeCrAl compositions have been tested in liquid lead or liquid lead-bismuth-eutectic solution. In a study by Weisenburger et al, it is shown that model FeCrAl-alloys containing ≥12.5 wt % Cr and ≥6 wt % Al were able to form thin protective alumina scales in the temperature interval of 400-600° C. [Weisenburger, Jianu, Doyle, Bruns, Fetzer, Heinzel, DelGiacco, An, Müller, *"Oxide scales formed on Fe—Cr—Al-based model alloys exposed to oxygen containing molten lead"*, Journal of Nuclear Materials 437 (2013) 282-292]. Another work by Lim et al, showed that a Fe-13Cr-4Al alloy would be able to form protective alumina from 500° C. [Lim, Hwang, Kim, *"Design of alumina forming FeCrAl steels for lead or lead-bismuth cooled fast reactors"*, Journal of Nuclear Materials 441 (2013) 650-660].

Korean patent KR 10-1210531 shows a FeCrAl-alloy which is intended for use in nuclear power applications.

FeCrAl-alloys may also comprise reactive element (RE), which are elements with high affinity to oxygen and carbon. At high temperatures, approx. 1000° C., additions of reactive element such as Y, Zr and Hf improve the alloys oxidation properties by balancing the outward diffusion of metal ions and the inward diffusion of oxygen, which leads to a balanced oxide growth and thus a reduction of mechanical stresses and/or porosity in the oxide scale. Studies have been made on the influence of Zr- and Ti additions on the long-term (10,000 h) corrosion resistance of Fe-10Cr-6Al alloys in liquid lead at 550° C. [Ejenstam et al, *"Oxidation studies of Fe10CrAl-RE alloys exposed to Pb at 550° C. for 10,000 h"*, Journal of Nuclear Materials 443 (2013) 161-170].

However, although the research disclosed above has contributed to improvements of the properties of FeCrAl-alloys, there is still a need to increase the corrosion resistance of these alloys further.

SUMMARY

Thus, it is an aspect of the present disclosure to provide a FeCrAl-alloy having improved corrosion resistance. In particular, it is an aspect of the present disclosure to provide a FeCrAl-alloy having very good corrosion resistance at temperatures in the range of 300-800° C. in highly corrosive environments. Moreover, it is an aspect of the present disclosure to provide a FeCrAl-alloy which is resistance to corrosion in liquid lead alloys at temperatures in the range of 300-800° C. A further aspect of the present disclosure is to provide a FeCrAl-alloy which is suitable as construction material in applications such as a boiler and a furnace of a heat generating plant or of an energy generating plant. Other suitable applications include materials for overlay welding, spray coating or composite tubes. In particular, it is an aspect of the present disclosure is to provide a FeCrAl-alloy which is suitable as construction material in lead-cooled fast reactor system at a temperature range of 300-800° C.

BRIEF DESCRIPTION OF THE DRAWINGS

FIG. 1 is a schematic drawing showing the purpose of balancing RE and carbon.

FIGS. 2a and 2b are micrographs showing chromium-rich carbide formed in a comparative alloy.

FIG. 3a is a SEM image and FIG. 3b is a micrograph thereof showing oxidation behavior in comparative alloys.

FIG. 4a a SEM image and FIG. 4b is a micrograph thereof showing oxidation behavior in an alloy according to a first alternative of the disclosure.

DETAILED DESCRIPTION OF THE DISCLOSURE

Figure 5A:
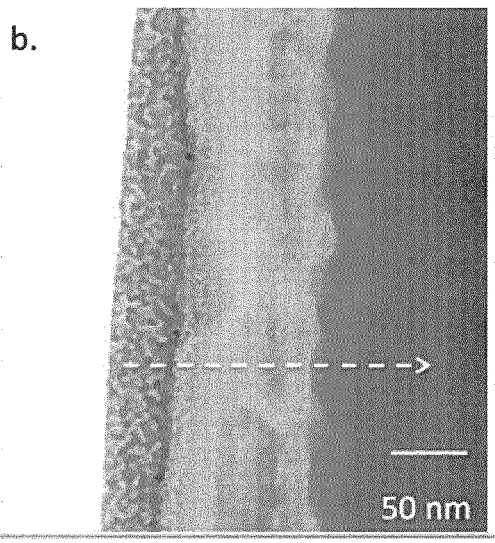
FIG. 5a SEM image and FIG. 5b is a micrograph thereof showing oxidation behavior in an alloy according to a second alternative of the disclosure.

The present disclosure therefore relates to a ferritic (FeCrAl)-alloy comprising in weight % (wt %):

C: 0.01-0.1;
N: 0.001-0.1;
O: ≤0.2;
B: ≤0.01;
Cr: 9-13;
Al: 2.5-8;
Si: ≤0.5;
Mn: ≤0.4;
Y: ≤2.2;
Sc+Ce+La: ≤0.2;
Mo+W: ≤4.0;
Ti: ≤1.7;
Zr: ≤3.3;
Nb: ≤3.3;
V: ≤1.8;
Hf+Ta+Th: ≤6.5;
the balance being Fe and unavoidable impurities, wherein, the amounts of Ti+Zr+Nb+Hf+V+Ta+Th and C, N and O are balanced such that:

$$\frac{at\%\ Ti + at\%\ Zr + at\%\ Nb + at\%\ V + at\%\ Hf + at\%\ Ta + at\%\ Th - x\,at\%\ O - at\%\ N}{at\%\ C} \geq 1$$

wherein x is 0.5 unless the content of Y is more than or equal to 0.01 wt % then x is 0.67.

The present disclosure also relates to a ferritic alloy comprising in weight %:
C: 0.01-0.1;
N: 0.001-0.1;
O: ≤0.2;
B: ≤0.01;
Cr: 9-11.5;
Al: 2.5-8;
Si: ≤0.5;
Mn: ≤0.4;
Y: ≤2.2;
Sc+Ce+La: ≤0.2;
Mo+W: ≤4.0;
Ti: ≤1.7;
Zr: ≤3.3;
Nb: ≤3.3;
V: ≤1.8;
Hf+Ta+Th: ≤6.5;
the balance being Fe and unavoidable impurities,
wherein, the amounts of Ti+Zr+Nb+Hf+V+Ta+Th and C, N and O are balanced such that:

$$\frac{at\%\ Ti + at\%\ Zr + at\%\ Nb + at\%\ V + at\%\ Hf + at\%\ Ta + at\%\ Th - x\,at\%\ O - at\%\ N}{at\%\ C} \geq 1$$

wherein x is 0.5 unless the content of Y is more than or equal to 0.01 wt % then x is 0.67.

The present disclosure also relates to a ferritic alloy comprising in weight %:
C: 0.01-0.1;
N: 0.001-0.1;
O: ≤0.2;
B: ≤0.01;
Cr: 9-11;
Al: 2.5-8;
Si: ≤0.5;
Mn: ≤0.4;
Y: ≤2.2;
Sc+Ce+La: ≤0.2;
Mo+W: ≤4.0;
Ti: ≤1.7;
Zr: ≤3.3;
Nb: ≤3.3;
V: ≤1.8;
Hf+Ta+Th: ≤6.5;
the balance being Fe and unavoidable impurities,
wherein, the amounts of Ti+Zr+Nb+Hf+V+Ta+Th and C, N and O are balanced such that:

$$\frac{at\%\ Ti + at\%\ Zr + at\%\ Nb + at\%\ V + at\%\ Hf + at\%\ Ta + at\%\ Th - x\,at\%\ O - at\%\ N}{at\%\ C} \geq 1$$

wherein x is 0.5 unless the content of Y is more than or equal to 0.01 wt % then x is 0.67.

The present disclosure further relates to a ferritic alloy comprising in weight %:
C: 0.01-0.1;
N: 0.001-0.1;
O: ≤0.2;
B: ≤0.01;
Cr: 9-13;
Al: 2.5-8;
Si: ≤0.5;
Mn: ≤0.4;
Y: ≤2.2;
Mo+W: ≤4.0;
Sc: ≤0.2;
Ti: ≤1.7;
Zr: ≤3.3;
Nb: ≤3.3;
V: ≤1.8;
Hf+Ta+Th: ≤6.5;
the balance being Fe and unavoidable impurities,
wherein, the amounts of Ti+Zr+Nb+Hf+V+Ta+Th and C, N and O are balanced such that:

$$\frac{at\%\ Ti + at\%\ Zr + at\%\ Nb + at\%\ V + at\%\ Hf + at\%\ Ta + at\%\ Th - x\,at\%\ O - at\%\ N}{at\%\ C} \geq 1$$

wherein x is 0.5 unless the content of Y is more than or equal to 0.01 wt % then x is 0.67.

The present disclosure further relates to a ferritic alloy comprising in weight %:
C: 0.01-0.1;
N: 0.001-0.1;
O: ≤0.2;
B: ≤0.01;
Cr: 9-13;
Al: 2.5-8;
Si: ≤0.5;
Mn: ≤0.4;
Y: ≤2.2;
Mo+W: ≤4.0;
Ti: ≤1.7;
Zr: ≤3.3;
Nb: ≤3.3;
V: ≤1.8;
Hf+Ta+Th: ≤6.5;
the balance being Fe and unavoidable impurities,
wherein, the amounts of Ti+Zr+Nb+Hf+V+Ta+Th and C, N and O are balanced such that:

$$\frac{at\%\ Ti + at\%\ Zr + at\%\ Nb + at\%\ V + at\%\ Hf + at\%\ Ta + at\%\ Th - x\,at\%\ O - at\%\ N}{at\%\ C} \geq 1$$

wherein x is 0.5 unless the content of Y is more than or equal to 0.01 wt % then x is 0.67.

The alloy of the present disclosure further comprises chromium and reactive elements such as Ti, Zr, Nb, Hf, V, Ta and Th. The reactive elements may be present individually in the alloy or in any combination. As will be explained more in detail below, these elements are added to the alloy for improving the formation of the protective $Al_2O_3$ layer or its properties. FeCrAl-alloys typically contain carbon. Carbon may have been added deliberately, for example to increase strength, or may exist in the alloy as an incidental impurity resulting from the production process, for instance. These reactive elements, such as Ti, Zr, Nb, Hf, V, Ta and Th, are also strong carbide formers, i.e. their affinity to carbon is high and thus carbon present in the alloy will be drawn to chromium or the reactive elements and form carbides.

Through experiments, the inventors have surprisingly found that the oxidation resistance of a FeCrAl-alloy is greatly improved when the amounts, in atom percent, of the reactive elements are balanced with the amount, in atom percent, of carbon in the alloy such that the quotient between reactive elements and carbon is equal to or greater than 1.

The mechanism behind the disclosure is more easily understood when a corrosion study is made in an alloy in which there is a deficit of reactive elements in relation to carbon.

FIG. 1 shows schematically a FeCrAl-alloy in which the quotient between reactive elements and carbon is close to or less than 1.

During solidification after casting of the alloy, the reactive elements (RE) initially form carbides and nitrides in the bulk of the alloy.

According to the disclosure, the amounts, in atom percent, of the reactive elements are balanced with the amount, in atom percent, of carbon in the alloy such that the quotient between reactive elements available to form carbides and available carbon is equal to or greater than 1. This will result in that at least an equal amount of atoms of the available reactive elements and available carbon atoms will be present in the alloy as defined hereinabove or hereinafter. Since the reactive elements are the strongest carbide formers in the alloy, stronger than chromium and the other alloy constituents, all free carbon will be drawn to the available reactive elements and form carbides therewith. Hence, there will be no free carbon left in the alloy to form chromium-rich carbides as long as the content of available reactive elements is sufficient.

An additional positive effect is that the formed carbides of the reactive elements are homogenously distributed throughout the bulk of FeCrAl-alloy as defined hereinabove or hereinafter and thus contribute to the mechanical strength of the alloy by dispersion hardening.

According to one embodiment of the FeCrAl alloy as defined hereinabove or hereinafter, the quotient between available reactive elements and carbon is greater than or equal to 1 i.e. there is a surplus of reactive elements in the alloy. The reason therefore is that some reactive elements will be consumed in the process of formation of the protective $Al_2O_3$ layer and contribute to increased adhesion between the $Al_2O_3$ layer and the alloy surface. By balancing the amount of reactive elements so that there is a surplus thereof after reacting with carbon and nitrogen, the formation of even minute amounts of chromium rich carbides are avoided.

According to another embodiment, the lowest quotient for the FeCrAl alloy as defined hereinabove or hereinafter is at least or equal to 1.1. This quotient means that there will be at least enough reactive elements present in the alloy after formation of the $Al_2O_3$ layer to consume all free carbon.

The highest possible quotient between the reactive elements and carbon is determined by the stability of the intermetallics which the reactive elements may form in the alloy. According to embodiment of the present FeCrAl alloy, the highest quotient may be 2.3 or lower.

The quotient between reactive elements and carbon may also be 1.1-2.2, such as 1.2-2.0.

The ferritic alloy as defined hereinabove or hereinafter may be manufactured by conventional steel manufacturing methods, so called melt metallurgy, including: melting in an inductive furnace, ladle refining of the melt by casting in moulds followed by hot rolling. The ferritic alloy as defined hereinabove or hereinafter may also be manufactured by powder metallurgy, in this case including the steps of producing metal powder by atomizing, compacting the powder and followed by sintering or Hot Isostatic Pressing.

The constituents of the alloy as defined hereinabove or hereinafter will in the following be described in detail.

The balance in FeCrAl alloy as defined hereinabove or hereinafter is Fe and unavoidable impurities. Examples of unavoidable impurities are elements and compounds which have not been added on purpose, but cannot be fully avoided as they normally occur as impurities in e.g. the material used for manufacturing the FeCrAl alloy.

When the term "≤" is used in the following context: "element≤number", the skilled person knows that the lower limit of the range is 0 wt % unless another number is specifically stated.

Carbon (C)

Carbon is included in the FeCrAl alloy as defined hereinabove or hereinafter to increase strength by precipitation hardening. Carbon may also be present as an unavoidable impurity resulting from the production process. To achieve sufficient strength in the alloy, carbon should be present in an amount of at least 0.01 wt %. At too high levels, carbon may result in difficulties to form the material and a negative effect on the corrosion resistance. Therefore, the maximum amount of carbon is 0.1 wt % in the alloy as defined hereinabove or hereinafter. For example carbon is 0.02-0.09 wt %, such as 0.02-0.08 wt %, such as 0.02-0.07 wt % such as 0.02-0.06 wt % such as 0.02-0.05 wt %, such as 0.01-0.04 wt %.

Nitrogen (N)

Nitrogen may be included in the FeCrAl alloy as defined hereinabove or hereinafter to increase strength by precipitation hardening. Nitrogen may also be present as an unavoidable impurity resulting from the production process. At too high levels, nitrogen may result in difficulties to form the material and may have a negative effect on the corrosion resistance. Therefore, the maximum amount of nitrogen is 0.1 wt % in the FeCrAl alloy as defined hereinabove or hereinafter. To achieve sufficient precipitation hardening in melt metallurgy, nitrogen should be at least 0.001 wt %, examples of suitable ranges of nitrogen is for example 0.001-0.08 wt %, such as 0.001-0.05 wt %, such as 0.001-0.04 wt %, such as 0.001-0.03 wt %, such as 0.001-0.02 wt %, such as 0.001-0.01 wt %. In powder metallurgy, the nitrogen content may be at least 0.01 wt %. For example, in powder metallurgy nitrogen is 0.01-0.1 wt %, such as 0.01-0.08 wt %.

Oxygen (O)

Oxygen may exist in the ferritic alloy as defined hereinabove or hereinafter as an impurity resulting from the production process in amounts up to 0.02 wt %, such as up to 0.005 wt %. In melt metallurgy, oxygen may be 0.001-0.08 wt %, such as 0.001-0.05 wt %, such as 0.001-0.02 wt %. In powder metallurgy, oxygen may be deliberately added to achieve a precipitation hardening effect. The alloy as defined hereinabove or hereinafter then comprises up to 0.2 wt % oxygen, such as 0.01-0.2 wt % oxygen, such as 0.01-0.1 wt %, such as 0.01-0.08 wt %.

Chromium (Cr)

Chromium promotes the formation of the $Al_2O_3$ layer on the alloy as defined hereinabove or hereinafter through the so-called third element effect, i.e. by formation of chromium oxide in the transient oxidation stage. Chromium shall be present in the alloy as defined hereinabove or hereinafter in an amount of at least 9 wt %. However, as the alloy as defined hereinabove or hereinafter is intended for use in the temperature range of 300-800° C., chromium should not exceed 13 wt % in order to avoid the miscibility gap in the Fe—Cr system where α-α' phase separation results in embrittlement of the FeCrAl-alloy. For example, chromium may be 9-13 wt %, such as 9-12 wt %, such as 9-11 wt %, such as 9-10 wt %. According to one specific embodiment, Cr is in the range of 9-11 wt %, such as 9 to 10 wt %. According to yet one specific embodiment, Cr is in the range of 9 to 11.5 wt %.

Aluminum (Al)

Aluminum is an important element in the alloy as defined hereinabove or hereinafter as aluminum, when exposed to oxygen at high temperature, will form the dense and thin oxide $Al_2O_3$, which will protect the underlying alloy surface from further oxidation. The amount of aluminum should be at least 2.5 wt % to ensure that the $Al_2O_3$ layer is formed and that sufficient aluminum is present to heal the $Al_2O_3$ layer when damaged. However, aluminum has a negative impact on the formability of the alloy and the amount of aluminum should not exceed 8 wt % in the alloy as defined hereinabove or hereinafter. For example, aluminum may be 3-7 wt %, such as 3-5 wt %, such as 3.5-6 wt %, such as 4 to 6 wt %.

Silicon (Si)

Silicon may be present as an impurity in the alloy as defined hereinabove or hereinafter up to 0.5 wt %, such as from 0 to 0.4 wt %

Manganese (Mn)

Manganese may be present as an impurity in the alloy as defined hereinabove or hereinafter up to 0.4 wt %, such as from 0 to 0.3 wt %

Yttrium (Y)

Yttrium may be added in an amount up to 0.8 wt % to improve the adherence of the $Al_2O_3$ layer, such as amounts up to 0.3 wt %, such as up to 0.1 wt %. However, if yttrium is added to the ferritic alloy as defined hereinabove or hereinafter in amounts of more than or equal to 0.01 wt %, then the formation of yttrium oxides will affect the quotient and then x is 0.67. Furthermore, when using powder metallurgy, if yttrium is added, the yttrium content is present in an amount of at least 0.01 wt %, in order to accomplish a desired dispersion hardening effect by oxides and/or nitrides. The maximum amount of yttrium in dispersion hardened alloys may be up to 2.2 wt %, such as up to 1.2 wt %, such as up to 1 wt %. Examples on suitable ranges are: 0.01 to 1.2 wt %, 0.01 to 1 wt % and 0.04 to 1.

Scandium (Sc), Cerium (Ce) and Lanthanum (La)

Scandium, Cerium, and Lanthanum are interchangeable elements and may be added individually or in combination in a total amount of up to 0.2 wt % to improve oxidation properties, self-healing of the $Al_2O_3$ layer or the adhesion between the alloy and the $Al_2O_3$ layer. According to one specific embodiment, the ferritic alloy as defined hereinabove or hereinafter, does not comprise any added Sc, Ce and La, i.e. zero wt % purposely added Sc, Ce and/or La. According to yet one specific embodiment, the ferritic alloy as defined hereinabove or hereinafter, does not comprise any added Ce and/or La.

Molybdenum (Mo) and Tungsten (W)

Both molybdenum and tungsten have positive effects on the hot-strength of the alloy as defined hereinabove or hereinafter and may be added individually or in combination in an amount up to 4.0 wt %, such as from 0 to 2.0 wt %.

Reactive Elements (RE)

Per definition, the reactive elements are highly reactive with carbon, nitrogen and oxygen. Titanium (Ti), Zirconium (Zr), Niobium (Nb), Vanadium (V), Hafnium (Hf), Tantalum (Ta) and Thorium (Th) are reactive elements in the sense that they have high affinity to carbon, thus being strong carbide formers. These elements are added in order to improve the oxidation properties of the alloy as defined hereinabove or hereinafter by balancing the diffusion of metal ions and oxygen, which will govern the kinetics of the oxide growth process. The maximum amounts of respective reactive element will depend mainly on tendency of the element to form adverse intermetallic phases. Yttrium is usually considered to be a reactive element but is in the present disclosure discussed in a separated paragraph and is also not a part of the quotient (except that it will affect which number x should have) because it will not form as strong carbides as the other reactive elements mentioned above.

Therefore, the maximum amount of titanium is 1.7 wt % in the alloy as defined hereinabove or hereinafter, such as 0.02-1.7 wt %. In melt metallurgy, suitable amounts of titanium are 0.02-1.3 wt %, such as 0.02-0.98 wt %, such as 0.02-0.85 wt %, such as 0.04-0.75 wt %. In powder metallurgy, suitable amounts of titanium are 0.02-1.3 wt %, such as 0.04-0.75 wt %, such as 0.05-0.75 wt %.

The maximum amount of zirconium and niobium is 3.3 wt % in the alloy as defined hereinabove or hereinafter respectively. The amounts of zirconium and niobium may be of from 0.04-3.3 wt % respectively. In melt metallurgy, zirconium may be 0.04-2.4 wt %, such as 0.04-1.9 wt %, such as 0.04-1.6 wt %, such as 0.08-1.4 wt %, such as 0.1 to 0.9 wt %, such as 0.1 to 0.6 wt %. In powder metallurgy, zirconium may be 0.04-2.4 wt %, such as 0.08-1.4 wt %, such as 0.3-1.4 wt %, such as 0.1 to 0.9 wt %, such as 0.1 to 0.6. In melt metallurgy, niobium may be 0.04-2.4 wt %, such as 0.04-1.9 wt %, such as 0.04-1.6 wt %, such as 0.08-1.4 wt %. In powder metallurgy, niobium may be 0.04-2.4 wt %, such as 0.08-1.4 wt %, such as 0.08-1.2 wt %.

As an example, an alloy may include Ti+Zr in an amount of 0.04-3.1 wt %. An alloy for suitable melt metallurgy may include Ti+Zr in amounts of 0.06-2.0 wt %, such as 0.12-1.7 wt %. An alloy suitable for powder metallurgy may include Ti+Zr in amounts of 0.04-2.3 wt %, such as 0.06-2.0 wt %.

Other examples are:

An alloy may include Ti+Nb in amounts of 0.04-3.1 wt %. An alloy suitable for melt metallurgy may include Ti+Nb in amounts of 0.06-2.0 wt %, such as 0.12-1.7 wt %. An alloy suitable for powder metallurgy may include Ti+Nb in amounts of 0.04-2.3 wt %, such as 0.06-2.0 wt %.

An alloy may include Zr+Nb in amounts of 0.04-4.6 wt %. An alloy for melt metallurgy suitable may include Zr+Nb in amounts of 0.08-2.8 wt %, such as 0.16-2.5 wt %. An alloy for suitable powder metallurgy may include Zr+Nb in amounts of 0.04-3.3 wt %, such as 0.08-2.8 wt %.

The maximum amount of vanadium is 1.8 wt %;

Hafnium, tantalum and thorium are interchangeable elements and may be added to the alloy as defined hereinabove or hereinafter individually or in combination in a total amount of up to 6.5 wt %.

Iron (Fe) and unavoidable impurities make up the balance in the alloy as defined hereinabove or hereinafter.

The Quotient Between Available Reactive Elements and Oxygen, Nitrogen and Carbon:

$$\frac{\text{at \% Ti} + \text{at \% Zr} + \text{at \% Nb} + \text{at \% V} + \text{at \% Hf} + \text{at \% Ta} + \text{at \% Th} - x\,\text{at \% O} - \text{at \% N}}{\text{at \% C}}$$

In the alloy as defined hereinabove or hereinafter, the amount of each reactive element is balanced to the amount of carbon with regards to the type of carbides that are thermodynamically stable under the conditions that prevail during the manufacturing of the alloy.

Under the thermodynamic conditions that prevail during the manufacturing of the alloy, the reactive elements form the following carbides:

Ti+C ⇔ TiC

Nb+C ⇔ NbC

Zr+C ⇔ ZrC

Hf+C ⇔ HfC

V+C ⇔ VC

Under some circumstances the reactive elements Nb and V may also form lower carbides:

2V+C ⇔ V$_2$C

2Nb+C ⇔ Nb$_2$C

However, at the thermodynamic conditions that prevail in the alloy during the manufacturing process, these carbides have a low stability and may therefore be neglected in the quotient.

Further, in addition to the content of carbon, the FeCrAl-alloy may also contain nitrogen and/or oxygen, therefore these two elements must also be considered in the quotient. As described above, nitrogen and oxygen may exist in the alloy as impurities or may have been added deliberately in order to improve the properties of the FeCrAl-alloy. For example, when the FeCrAl-alloy is used in powder metallurgical applications, the content of nitrogen and oxygen in the FeCrAl alloy may be substantial. When nitrogen and oxygen are present, some of the reactive elements are consumed in the form of nitrides and oxides. This will result in that less reactive elements are left to react with the free carbon to form stable carbides which in turn will have an impact on the protective oxide formation.

Examples of thermodynamically stable nitrides of the reactive elements in the alloy are: TiN, ZrN, HfN, VN, TaN and ThN and examples of thermodynamically stable oxides of the reactive elements in the alloy are: TiO$_2$, ZrO$_2$, HfO$_2$, Y$_2$O$_3$ and ThO$_2$.

Thus, to compensate for the reactive elements consumed by forming stable nitrides and oxides, the amount of nitrogen and of oxygen in the alloy is deducted from the amount of the reactive elements in the quotient.

The amount of oxygen in the quotient must be multiplied with a weighting factor, "x", which is selected from 0.5 or 0.67. The value of the weighing factor depends on which type of oxide is formed, i.e. it depends on which elements are comprised in the alloy and also which oxide is the most thermodynamically stable at the conditions that prevail during manufacturing. As the most commonly formed oxide is a dioxide, the weighing factor may be selected to about 0.5. However, if the element yttrium is present in the alloy (more than or equal to 0.01 wt %), then the most stable oxide formed is a tri-oxide, such as Y$_2$O$_3$ or AlYO$_3$ and then x is 0.67.

In the quotient, the reactive elements, carbon and if applicable, nitrogen and oxygen, are balanced on the basis of the atom percentage of respective element because it is important to ensure that for each reactive element, sufficient amounts are added in order to match the number of free carbon atoms in the alloy so that the desired carbide is formed.

In operation, the ferritic alloy as defined hereinabove or hereinafter will form and therefore comprise a surface oxide layer. The surface oxide layer will comprise an outer layer of (Al$_2$Fe)O$_4$-oxide, a middle layer of Cr$_2$O$_3$ oxide and an inner layer of Al$_2$O$_3$.

The ferritic alloy as defined hereinabove or hereinafter may also comprise dispersoids of ZrC and/or NbC and/or Nb$_2$C and/or HfC and/or VC and/or ThC and/or TaC. The dispersoids may be in the form of cluster comprising a TiC dispersoid core and enclosed by dispersoids of ZrC and/or NbC and/or Nb$_2$C and/or HfC and/or VC and/or ThC and/or TaC.

DETAILED DESCRIPTION OF EXAMPLES

The disclosure will be described by the following non-limited example:

The example aims at investigating Fe-10Cr-4Al alloys, and specifically to investigate the influence of different reactive elements (RE) on the long-term (8,760 h) corrosion resistance to liquid lead at 550° C. In addition, a short-term (1,000 h) test at 450° C. was conducted for comparative reasons.

The influence of additions of the reactive elements (RE): Zr, Nb and Y were selected for the example. Nine experimental alloys, with varying RE content, were produced in a vacuum induction furnace. Samples were hot-rolled to 8×1 mm strips and homogenized at 1050° C. for 5 minutes after each step. The analyzed chemical compositions for all studied alloys are presented in table 1.

TABLE 1

Chemical composition of studied alloys (wt %)

| Alloy | Fe | Cr | Al | Si | Mn | C | Ti | Zr | Nb | Y | RE/C (at. %) |
|---|---|---|---|---|---|---|---|---|---|---|---|
| Zr-0.1 | Bal. | 10.12 | 3.98 | 0.12 | 0.11 | 0.04 | 0.08 | 0.11 | — | — | 0.89 |
| Zr-0.2 | Bal. | 10.15 | 3.95 | 0.13 | 0.11 | 0.03 | 0.09 | 0.21 | — | — | 1.67 |
| Zr-0.4 | Bal. | 10.20 | 4.06 | 0.12 | 0.12 | 0.03 | 0.07 | 0.39 | — | — | 2.30 |
| Nb-0.4 | Bal. | 10.20 | 4.10 | 0.15 | 0.07 | 0.03 | 0.11 | — | 0.46 | — | 2.94 |
| Nb-0.8 | Bal. | 10.17 | 4.12 | 0.12 | 0.12 | 0.03 | 0.08 | — | 0.9 | — | 4.95 |

TABLE 1-continued

Chemical composition of studied alloys (wt %)

| | | | | | | | | | RE | | |
| --- | --- | --- | --- | --- | --- | --- | --- | --- | --- | --- | --- |
| Alloy | Fe | Cr | Al | Si | Mn | C | Ti | Zr | Nb | Y | RE/C (at. %) |
| Nb—0.8C | Bal. | 10.12 | 4.16 | 0.12 | 0.12 | 0.1 | 0.06 | — | 0.85 | — | 1.32 |
| Y-0.02* | Bal. | 10.26 | 4.24 | 0.07 | 0.12 | 0.03 | 0.07 | — | — | 0.02 | 0.70 |
| Y-0.1* | Bal. | 10.21 | 4.14 | 0.12 | 0.13 | 0.03 | 0.07 | — | — | 0.09 | 0.87 |
| Y-0.2* | Bal. | 10.12 | 4.05 | 0.12 | 0.11 | 0.03 | 0.08 | — | — | 0.19 | 1.45 |

*Even though the quotient according to the definition herein does not comprise Y, Y was included in quotient for the last three alloys because of comparison. However, as will be shown and which is also discussed in the present disclosure, yttrium will be acting different compared to the RE.

The contents of RE and carbon was varied in the nine samples, such that some samples had a deficit of RE in comparison to the amount of carbon (samples Zr-0.1, Y-0.02, Y-0.1), in some samples the amounts of RE and carbon was in balance (samples Zr-0.2, Nb-0.8C, Y-0.2) and in some samples RE was in excess in comparison to carbon (samples Zr-0.4, Nb-0.4, Nb-0.8).

Coupons measuring 30×8×1 mm were prepared of each alloy for the oxidation study. The surfaces were polished to a #800 grit finish using SiC abrasive papers, after which the coupons sonicated in ethanol and subsequently placed in alumina crucibles filled with 2 mm 99.9% (metal base) lead shots. The oxidation test was carried out in a tube furnace, where the crucibles were placed inside sealed quartz tubes. The dissolved oxygen content in the liquid lead was controlled by means of a flowing Ar—$H_2$—$H_2O$ gas mixture. $H_2/H_2O$ ratios of 1.3 and 0.2 were used to achieve a dissolved oxygen concentration of $10^{-7}$ wt % in the liquid lead at 550° C. and 450° C. respectively. After finishing the oxidation tests, 1000 h at 450° C. and 8760 h at 550° C., the samples were air cooled and cleaned from residual lead in a (1:1) solution of acetic acid and hydrogen peroxide. Transmission electron microscopy (TEM) samples were prepared through the standard lift-out using a FEI quanta 3D field emission scanning electron microscope (FEG-SEM). The TEM evaluation was carried out using a JEOL JEM-2100F FEG TEM. Energy dispersive spectroscopy (EDS) elemental analysis was made using an Oxford instruments 80 mm$^2$ X-Max$^N$ silicon drift detector (SDD). SEM samples were prepared by molding the oxidized sample into a conductive resin followed by fine polishing down to a final 0.25 µm diamond step. A Zeiss Leo 1530 FEG-SEM an Oxford 50 mm$^2$ X-Max SDD EDS were used for general characterization. Thermodynamic modeling was carried out using ThermoCalc running the TCFE7 and SSOL4 databases.

Results from the Investigations

The results from the 8,760 h oxidation test at 550° C. showed clear differences in oxidation properties with respect to various RE additions.

The three alloys (Zr-0.1, Y-0.02 and Y-0.1) which had a deficit of RE in comparison to carbon formed significant amounts of Cr-rich carbides. FIG. 2a shows a Cr-carbide (1) close to an Al-rich oxide scale (2) formed on the surface (3) of the sample. In FIG. 2a, the Cr-rich carbide may be detected as a white shape inside the encircled area. FIG. 2b is a TEM Cr EDS map of the chrome-rich carbide area (1) encircled in FIG. 2a. Here the shape of the chrome-rich area is clearly visible.

The examples showed that nearly all Cr-carbides were formed in contact with the Al-rich oxide at the sample surfaces. This may be explained in that aluminum suppresses carbide formation, i.e. stabilizes graphite. It seems thus likely that the Cr-carbide nucleation is promoted at the Al-depleted metal-oxide phase boundary. Thus, the protective Al-oxide had not been formed properly.

Furthermore, the three alloys, Zr-0.1, Y-0.02 and Y-0.1, all showed poor oxidation properties in the oxidation tests. The poor results were consistent both at 550° C. and at 450° C., this shows that it is important to select the correct quotient as described hereinabove or hereinafter.

FIG. 3a shows a SEM image of a cross-section of a sample taken from the Zr-0.1 alloy after oxidation at a temperature of 550° C. It is clearly visible in the image an irregularly shaped mixed oxide, which has grown into the bulk of the alloy. The high amount of chromium-rich surface carbides in the metal-oxide interface of the Zr-0.1 sample seemingly leads to a pitting type of accelerated oxidation, displaying inward growing mixed metal oxides measuring up to about 5 µm.

At lower temperatures, where a low Cr-content is needed to avoid α-α' phase-separation, the presence of chromium-rich surface carbides resulted in formation of non-protective oxide scales. This was confirmed by the shorter (1000 h) oxidation test at 450° C. The same three alloys that contained carbides close to the surface (Zr-0.1, Y-0.02, Y-0.1) and that had a deficit of RE in comparison to carbon were completely covered with a three-layered oxide structure, consisting of an outward growing $Fe_3O_4$ scale and an inward growing FeCrAl mixed oxide, under which an internal oxidation zone was seen. FIG. 3b shows a SEM micrograph of the Y-0.02 sample having the above described structure of oxide layers. The total depth of the corrosion attacks on the Y-0.02 sample was measured to 3-4 µm.

Balanced Alloys

Hence, by balancing the C and RE content, the corrosion performance of FeCrAl-alloy was improved. Three alloys in the study, Zr-0.2, Y-0.2 and Nb-0.8C, contained RE in near balance with respect to the C-content, displayed significantly different oxidation behavior at 550° C.

Zr-0.2

The Zr-0.2 alloy showed no signs of oxidation attacks. A TEM evaluation was carried out to study the surface of the Zr-0.2 sample and it showed the presence of a thin, approximately 100 nm thick oxide that had formed during the 8,760 h exposure in liquid lead, see FIG. 4b. The oxide was divided into three layers, an inward growing $Al_2O_3$ layer and an outward growing FeAl mixed oxide, delimited by a thin Cr-rich oxide layer. FIG. 4b is a TEM EDS line scan showing the chemical composition of the layer in FIG. 3a as a function of the distance from the surface of the layer.

Figure 5B:
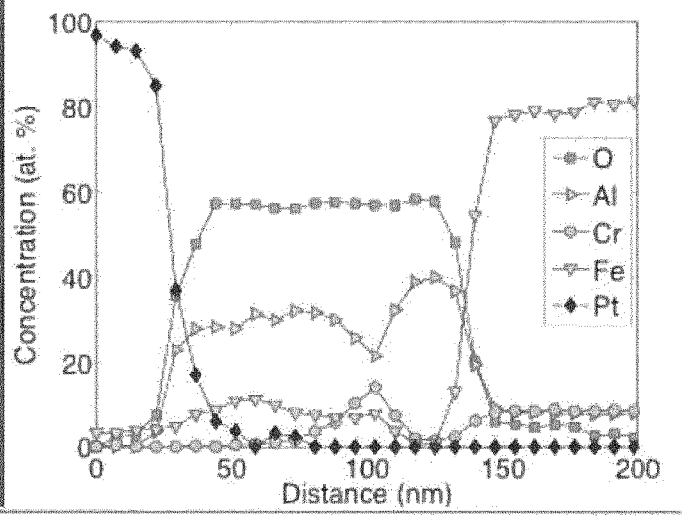

At 450° C., the Zr-0.2 alloy displayed favorable oxidation properties, i.e. a protective oxide layer was formed, see FIG. 4a. The thin oxide that was formed on its surfaces was investigated by means of TEM and was measured to about 40 nm. Similar to the TEM results at 550° C., the oxide formed at 450° C. was divided into three zones, an inner layer solely enriched in Al, an outer part rich in Fe, and an intermediate layer rich in Cr (FIG. 4b). FIG. 5b is a TEM EDS line scan showing the chemical composition of the layer in FIG. 5a as a function of the distance from the surface of the layer.

Nb-0.8C

The Nb-0.8C alloy showed no oxidation attacks at 550° C.

Y-0.2

Localized oxidation pits were found on the Y-0.2 alloy after treatment at 550° C. despite the slight excess of Y in relation to C. This may be explained by the relatively weak stability of yttrium carbides compared to those of Zr and Nb. The microstructure characterization found Y-rich precipitates, which were enriched in C, O, S and in particular Fe.

Large Excess Ratio Alloys

The samples having a large excess of RE compared to C, (i.e. samples Zr-0.4, Nb-0.4, Nb-0.8) showed poor oxidation properties at both 550° C. and 450° C. The Zr-0.4 alloy, showed pitting type oxidation attack at 550° C. and Fe and Zr-rich phases measuring up to 2 µm was found throughout the matrix. In addition, the oxide pits on the same alloy were enriched in Zr.

The alloys Zr-0.4 and the Y-0.2 preformed in a similar manner at 450° C. The impact of the excess of Y and Zr did not result in a marked decrease in oxidation properties at 450° C., as was the case at 550° C. However, the slower reaction kinetics at 450° C. in comparison to 550° C. and a shorter exposure time may have masked the result.

After treatment at 550° C., the Nb-0.8 alloy was almost entirely covered with oxidation pits, which measured up to 5 µm. These precipitates were preferably found to decorate the alloy grain boundaries, similar to the behavior of laves phases, but were also found inside the grains of the Nb-0.8- alloy.

CONCLUSIONS

It has been shown that best oxidation resistance is achieved when the RE-additions are in balance with the carbon content of the alloy, i.e. the RE is in slight excess. A deficit of RE in respect of carbon will lead to the formation of chromium rich carbides close to the surface of the alloy which in turn will lead to poor oxidation properties and reduced pitting corrosion resistance. Further, over-doping of RE will lead to the formation of intermetallics or laves phase, which will also decrease the oxidation resistance of the alloy.

The invention claimed is:

1. A ferritic alloy comprising in weight %:
C: 0.01-0.04;
N: 0.02-0.1;
O: 0.01-0.1;
B: ≤0.01;
Cr: 9.0-11.5;
Al: 2.5-8.0;
Si: <0.5;
Mn: <0.4;
Y: 0.01-1.2;
Sc+Ce+La: ≤0.2;
Mo+W: ≤4.0;
Ti: 0.06-0.09;
Zr: 0.04-2.4;
Nb: 0.04-2.4;
V: <1.8;
Hf+Ta+Th: <6.5;
the balance being Fe and unavoidable impurities,
wherein the amounts of Ti+Zr+Nb+V+Hf+Ta+Th and C, N and O are balanced such that:

$$1.2 \leq \frac{at\% Ti + at\% Zr + at\% Nb + at\% V + at\% Hf + at\% Ta + at\% Th - x * at\% O - at\% N}{at\% C} \geq 2.0$$

wherein x is 0.5 unless the content of Y is more than or equal to 0.01 wt % then x is 0.67, and
wherein the ferritic alloy includes dispersoids of one or more of ZrC, NbC, $Nb_2C$, HfC, VC, ThC, TaC, or combinations thereof.

2. The ferritic alloy according to claim 1, wherein the ferritic alloy comprises no added wt % Sc+Ce+La or no added wt % Ce+La.

3. The ferritic alloy according to claim 1, wherein the ferritic alloy comprises Cr in the range of from 9.0 to 11.0 wt %.

4. The ferritic alloy according to claim 1, wherein C is in the range of from 0.02-0.03 wt %.

5. The ferritic alloy according to claim 1, wherein N is in the range of from 0.02-0.08 wt %.

6. The ferritic alloy according to claim 1, wherein O is in the range of from 0.01-0.08 wt %.

7. The ferritic alloy according to claim 1, wherein Al is in the range of from 3.0-7.0 wt %.

8. The ferritic alloy according to claim 1, wherein Y is in the range of from 0.04-1.0 wt %.

9. The ferritic alloy according to claim 1, wherein Ti is in the range of from 0.06-0.08 wt %.

10. The ferritic alloy according to claim 1, wherein Zr is in the range of from 0.3-1.4 wt %.

11. The ferritic alloy according to claim 1, wherein Nb is in the range of 0.08-1.4 wt %.

12. A method of improving corrosion resistance, comprising:
forming an object from the ferritic alloy according to claim 1,
wherein, in operation, the object is exposed to a temperature range of 300-800° C.

13. The method of claim 12, wherein the object is selected from the group consisting of a boiler and a furnace of a heat generating plant or of an energy generating plant.

14. The method of claim 12, wherein the object is selected from the group consisting of an overlay welding, a spray coating and a composite tube.

15. The ferritic alloy according to claim 1, wherein Zr is in the range of from 0.1-0.9 wt % and wherein Nb is in the range of 0.08-1.4 wt %.

16. The ferritic alloy according to claim 1, wherein Zr+Nb is in the range of 0.08-2.8 wt %.

17. The ferritic alloy according to claim 1, wherein Al is in the range of from 4-6 wt %.

18. The ferritic alloy according to claim 1, wherein the ferritic alloy includes dispersoids, wherein the dispersoids are in the form of a cluster including a TiC dispersoid core enclosed by dispersoids of ZrC, NbC, $Nb_2C$, HfC, VC, ThC, TaC, or combinations thereof.

19. The ferritic alloy according to claim 1, wherein Ti is in the range of from 0.07-0.09 wt %.

20. The ferritic alloy according to claim 1, wherein Ti is in the range of from 0.07-0.09 wt % and C is in the range of from 0.03 to 0.04 wt. %.

* * * * *